(12) United States Patent
Leopold

(10) Patent No.: US 11,590,825 B2
(45) Date of Patent: Feb. 28, 2023

(54) AIR VENTS

(71) Applicant: fischer automotive systems GmbH & Co. KG, Horb a.N. (DE)

(72) Inventor: Gunter Leopold, Baiersbronn (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 8 days.

(21) Appl. No.: 17/218,319

(22) Filed: Mar. 31, 2021

(65) Prior Publication Data

US 2021/0323382 A1 Oct. 21, 2021

(30) Foreign Application Priority Data

Apr. 21, 2020 (DE) .................. 10 2020 110 735.8
Dec. 16, 2020 (DE) .................. 10 2020 133 649.7

(51) Int. Cl.
*B60H 1/34* (2006.01)
*F16H 3/22* (2006.01)
*F16H 19/04* (2006.01)

(52) U.S. Cl.
CPC .............. *B60H 1/3421* (2013.01); *F16H 3/22* (2013.01); *F16H 19/04* (2013.01); *B60H 2001/3471* (2013.01)

(58) Field of Classification Search
CPC .... B60H 2001/3471; B60H 2013/1446; B60H 1/34–2001/3478; B60H 1/3222; B60H 1/00421; B60H 1/00428; F16H 3/06; F16H 3/22; F16H 2019/046; F16H 19/04; Y10T 74/192; F16K 31/54; F16D 43/04; F16D 43/206
USPC ........................................................ 454/155
See application file for complete search history.

(56) References Cited

U.S. PATENT DOCUMENTS

| | | | | |
|---|---|---|---|---|
| 4,749,004 A * | 6/1988 | Peash | ............... | F16K 11/22 |
| | | | | 137/865 |
| 5,775,459 A * | 7/1998 | Jorg | ............... | B62D 5/0439 |
| | | | | 74/498 |
| 8,082,947 B2 * | 12/2011 | Chang | ............... | F16K 31/535 |
| | | | | 251/249 |

FOREIGN PATENT DOCUMENTS

| | | |
|---|---|---|
| CN | 104764179 A | 7/2015 |
| CN | 110466318 A | 11/2019 |
| DE | 299 04 449 U1 | 5/1999 |
| DE | 299 14 962 U1 | 10/1999 |
| DE | 19935549 A1 | 11/2000 |
| DE | 10220024 A1 | 11/2003 |
| DE | 102014102332 A1 | 6/2015 |
| DE | 102016105003 A1 | 9/2016 |
| DE | 10 2015 122 181 A1 | 6/2017 |
| EP | 1 048 499 A1 | 2/2000 |
| JP | 11310034 A2 | 11/1999 |

(Continued)

OTHER PUBLICATIONS

German Search Report for correspondnig Application No. 10 2020 110 737.4, dated Dec. 4, 2020.

*Primary Examiner* — Edelmira Bosques
*Assistant Examiner* — Michael James Giordano
(74) *Attorney, Agent, or Firm* — Renner, Otto, Boisselle & Sklar, LLP

(57) ABSTRACT

A gear system for pivoting blades of an air vent, which is releasable or disengageable. For this purpose, one embodiment provides a rack and pinion gear system comprising helical pinions, which engage with a toothed rack as a result of an axial force due to a helical spline when rotational driving, and thereby establish a drive connection with the blades.

13 Claims, 6 Drawing Sheets

(56) References Cited

FOREIGN PATENT DOCUMENTS

JP 2005-55061 A 3/2005

\* cited by examiner

AIR VENTS

This application claims priority under 35 USC § 119 to German Patent Application No. 10 2020 110 735.8, filed Apr. 21, 2020, and German Patent Application No. 10 2020 133 649.7, filed Dec. 16, 2020, the entire disclosures of which are incorporated herein by reference.

Technical Field of the Invention

The invention relates to an air vent.

Description of the Related Art

Air vents are used to supply air to a passenger compartment of a motor vehicle. Typically, these comprise two louvers arranged behind one another in a flow direction of an air current through the air vent, for laterally deflecting the air current. "Lateral" shall also mean a vertical deflection in the case of a horizontal air current. Each louver comprises multiple blades that can be pivoted parallel together, wherein the blades of the two louvers intersect one another so that the air current through the vent can be deflected in two directions. The blades are comparable to control surfaces used in control surface mechanisms of airplanes, wherein, for example, one louver serves as an elevator, and the other louver as a rudder. The invention is not limited to motor vehicles, but rather the air vent can also be used for guiding any air current.

European patent application EP 1 048 499 A1 discloses an air vent comprising a louver, having blades that can be electromechanically pivoted together by way of an electric motor. A slip clutch is present between the electric motor and the blades, so that the blades can be manually pivoted by overcoming a friction torque.

It is the object of the invention to provide an air vent comprising at least one pivotable blade, which can be pivoted electromechanically or moment-free manually. "Moment-free" also includes a low moment, for example due to bearing friction of the blades.

SUMMARY OF THE INVENTION

The air vent according to the invention comprises one or several jointly pivotable blades for guiding an air current flowing through the air vent. Separately pivotable blades, for example in two louvers, for guiding the air current in different directions are likewise possible. In addition to guidance, the blade can also be used, in the manner of a pivotable flap, for controlling the air current through the air vent. In this case, a flow cross-section of the air vent is more or less substantially blocked by pivoting of the blade, thereby regulating an air volume flowing through the air vent, which is referred to here as "controlling the air current" through the air vent.

The air vent according to the invention comprises an electromechanical drive, including a gear system and preferably an electric motor, for pivoting the blade or blades. The gear system is in particular mechanical and, for example, comprises meshing gear wheels and/or rolling friction wheels. According to the invention, the gear system can be released, in the sense of releasing a clutch, so that a drive connection, for example, from the electric motor of the electromechanical drive to the blade or blades in the gear system is interrupted. The releasing of the gear system can also be interpreted as disengaging or disconnecting. When released, the gear system does not transmit any force or moment to the blade or blades, so that the blade or blades can be pivoted moment-free, apart from bearing friction, for example, or a damping device for specifically setting an operating force. In any case no friction torque of a slip clutch has to be overcome to manually pivot the blade or blades. In particular, the gear system is configured so that the gear system automatically releases when the electromechanical drive is at a standstill, and automatically couples when the electromechanical drive generates rotary drive.

The invention has the advantage that the operating forces for manually pivoting the blades are not influenced by the electromechanical drive, and can thus be set separately.

For releasing the gear system, which is to say for interrupting the drive connection, one configuration of the invention provides two gear elements, which disengage axially or radially for release. When disengaged, the two gear elements do not transmit any force or moment. For pivoting the blade or blades, the two gear elements are engaged with one another, or are made to engage with one another, and transmit a force and/or a moment for pivoting the blade or blades.

A configuration of the invention encompassing different embodiments provides a transmission of torque by way of meshing, helical pinions and, if necessary, a helically toothed rack. "Meshing" means that splines of the pinions and, possibly, of the toothed rack are in engagement with one another. For releasing the drive connection, the helical pinions disengage from one another, which is to say the splines thereof no longer mesh with one another or with a spline of the toothed rack. An axial force is used for disengagement and/or engagement, which is generated by meshing helical pinions during the transmission of torque due to the helical splines thereof.

According to one configuration of the invention, the gear system of the electromechanical drive comprises a first and a second helical pinion, which mesh with one another for pivoting the blade. One of the two pinions is axially movable for releasing or for establishing the drive connection. An axial force, generated by the helical splines during a transmission of torque, axially moves the one pinion, thereby making the spline thereof engage with and/or to disengage from a spline of the other pinion, or of an additional toothed rack, so that the drive connection is established and/or released. The gear system including the helical pinions thus independently attains the drivingly connected state and/or the released state when the gear system is started up.

According to one refinement of the invention, the gear system comprises a first helical pinion and two second helical pinions, which are axially movable with respect to the first helical pinion. The two second helical pinions can be formed by two (helical) splines having a shared hub or the like, which is to say the two second helical pinions can be composed of one pinion having two (helical) splines. When a drive connection exists, at least one of the two second helical pinions meshes with the first helical pinion. When the drive connection is released, the pinions do not mesh with one another and/or do not mesh with a toothed rack. The axial force that arises during the transmission of torque between the helical pinions causes the spline of at least one of the two second pinions to engage with the spline of the first helical pinion and/or a spline of a likewise helically toothed rack, or causes the splines of both second helical pinions to disengage from the spline of the first helical pinion and/or spline of the toothed rack.

The two second helical pinions are preferably coaxial and/or non-rotatable with respect to one another, and/or the splines thereof are axially spaced apart from one another, which is to say a space exists between the splines of the second helical pinions, in which the spline of the first helical pinion and/or the spline of a toothed rack can be present when the gear system is released, which is to say the drive connection is interrupted.

In a refinement of the invention, when the gear system is at a standstill, a return spring returns the axially movable pinion back into an initial position in which the spline thereof is disengaged from the spline of the other pinion and/or of the toothed rack, or conversely is engaged with the spline of the other pinion and/or of the toothed rack.

According to another configuration of the invention, which likewise encompasses different embodiments, friction wheels, and possibly a further friction member, are provided, which roll on one another to transmit torque or a force. "Rolling" means that the friction wheels rest against one another and/or against the further friction member with a pressing force at a circumferential point so as to transmit torque by way of friction or, in the case of the further friction member, transmit a force. The further friction member in particular comprises a straight or curved rolling surface, which rests with pressing force against a circumferential point of one of the friction wheels, and can be moved tangentially to one of the friction wheels or in the longitudinal direction of the rolling surface. To release the gear system so as to interrupt the drive connection, the friction wheels can be moved radially with respect to one another and/or to the further friction member, and can thus be lifted off one another, so that no moment and no force is transmitted.

An embodiment of the invention comprising friction wheels provides that the gear system of the electromechanical drive comprises two friction wheels and a further friction member, serving as the drive connection, for transmitting, for example, the rotation of an electric motor to the blade or blades to pivot the blade or blades. The further friction member can, for example, be a further friction wheel or a linear friction member, for example displaceable tangential to one of the two friction wheels, comparable to a straight or curved toothed rack. The two friction wheels roll on one another so as to transmit rotation. When a drive connection exists, or so as to establish the drive connection, one of the two friction wheels rolls on the further friction member, so that rotation is transmitted, or converted into a linear movement/displacement. To release or disengage the gear system, which is to say to interrupt the drive connection, the one friction wheel is lifted off the further friction member. To automatically establish and/or interrupt the drive connection, this embodiment of the invention provides that a second of the two friction wheels can be rotated about an axis of a first of the two friction wheels, which is to say can be moved on a rotation path, so-to-speak, about the first friction wheel. The two friction wheels roll on one another so as to transmit rotation. The arrangement of the two friction wheels with respect to the further friction member is selected so that, in a first angular position of the second friction wheel with respect to the first friction wheel, the second friction wheel rolls on the further friction member, so that a drive connection is present. In a second angular position, the second friction wheel is lifted off the further friction member, so that the gear system is released or disengaged, which is to say the drive connection is interrupted. Rotationally driving the first friction wheel urges the second friction wheel, rolling thereon, in the circumferential direction of the first friction wheel, wherein rotational driving in one direction urges the second friction wheel in the sense of lifting off the further friction member, and rotational driving in the opposite direction urges the second friction wheel in the sense of pressing against the further friction member so that, when the first friction wheel is rotationally driven, the drive connection is automatically established and/or released.

According to a refinement of the invention, two second friction wheels are provided, which are offset with respect to one another in the circumferential direction of the first friction wheel, and which both roll on the first friction wheel. The two second friction wheels can be rotated, preferably jointly, about the axis of the first friction wheel, which is to say can be moved on the rotation path about the first friction wheel. In a first angular position of the two second friction wheels with respect to the first friction wheel, one of the two second friction wheels rolls on the further friction member, in a second angular position the other of the two second friction wheels rolls on the further friction member, and in a third angular position both second friction wheels are lifted off the further friction member. Rotational driving of the first friction wheel in one direction of rotation moves the two second friction wheels into the first angular position, so that the further friction member is moved in one direction, and the blade is pivoted in one direction, and rotational driving of the first friction wheel in the opposite direction moves the two second friction wheels into the second angular position, so that the further friction member is moved in the opposite direction, and the blade is pivoted in an opposite direction. During standstill, a return spring preferably urges the two second friction wheels into the third angular position, which can also be referred to as an "initial position" or as a "neutral position." The drive connection is also automatically established by rotational driving and/or is interrupted during a standstill in this embodiment of the invention.

According to one configuration of the invention, an electromagnetic clutch is provided for interrupting and/or establishing the drive connection, which is to say for releasing and/or connecting the gear system. The electromagnetic clutch is a clutch that is released and/or closed by way of an electromagnet. This comprises two clutch parts, for example, which can be made to engage with one another, or to disengage from one another, by a magnetic force of the electromagnet, wherein the engagement can be force-fit, which is to say by way of friction, and/or form-locked. The electromagnetic clutch can be monostable or bistable.

The features and feature combinations, embodiments and configurations of the invention mentioned above in the description, and the features and feature combinations mentioned hereafter in the description of the figures and/or shown in a figure, can be used not only in the respective indicated or illustrated combination, but also in other essentially arbitrary combinations, or alone. Embodiments of the invention that do not include all the features of a dependent claim are possible. It is also possible to replace individual features of a claim with other disclosed features or feature combinations. Embodiments of the invention are possible that do not include all the features of the exemplary embodiment or exemplary embodiments, but an essentially arbitrary portion of the characterizing features of one exemplary embodiment, optionally in combination with one, more or all features of one or more further exemplary embodiments.

BRIEF DESCRIPTION OF THE DRAWINGS

The invention will be described hereafter in greater detail based on one exemplary embodiment shown in the drawings. In the drawings.

DETAILED DESCRIPTION OF THE INVENTION

The figures are simplified schematic illustrations serving to describe, and provide an understanding of, the invention.

Figure 1:
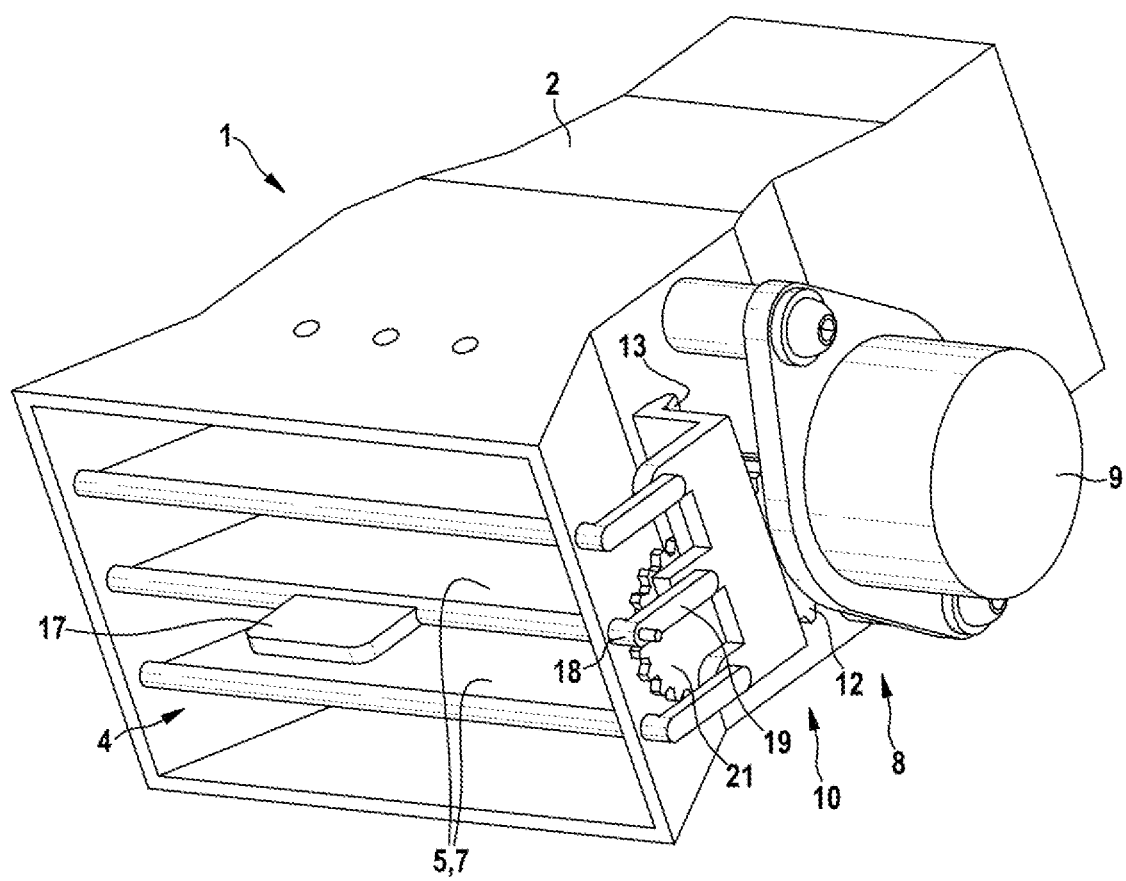
FIG. 1 shows a first exemplary embodiment of an air vent according to the invention in a perspective illustration.
Figure 2:
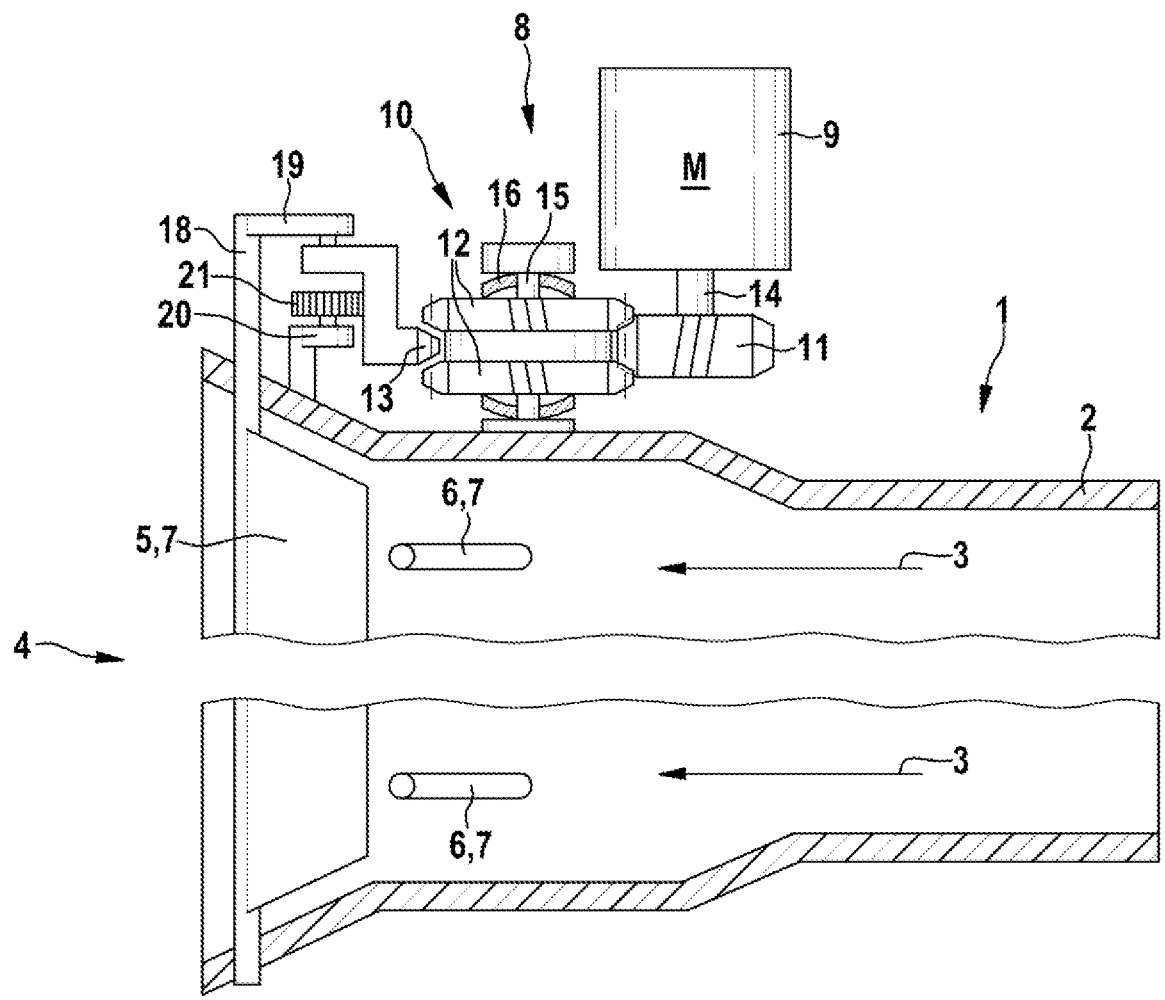
FIG. 2 shows a sectional view in a horizontal longitudinal center plane of the air vent in FIG. 1.

The air vent 1 according to the invention shown in a perspective view in FIG. 1 and in a sectional view in FIG. 2, is used to supply air to a passenger compartment of a motor vehicle, which is not shown, and is provided for a recessed installation, for example in an instrument panel (not shown) of the motor vehicle. The air vent 1 comprises a tubular housing 2, having a rectangular cross-section, which is flared in two locations with oblique widened regions. The shape of the housing 2 may deviate in embodiments of the invention.

In a flow direction, which is shown in FIG. 2 by way of flow arrows 3, directly upstream of an air outlet opening 4, the air vent 1 comprises two grilles 5, 6 arranged behind one another in the flow direction. The grilles 5, 6 comprise strip-shaped blades 7, which extend transversely or horizontally and vertically through the housing 2 and are pivotably mounted in the housing 2. The blades 7 of each grille 5, 6 can be pivoted in parallel together. The blades 7 are used to guide an air current through the housing 2 of the air vent 1, obliquely to the side, or toward the top and bottom.

For each grille 5, 6, the air vent 1 comprises an electromechanical drive 8, including an electric motor 9 and a gear system 10 for pivoting the blades 7, which is electromechanical in the exemplary embodiments. Only one of the two electromechanical drives 8 is visible, the other electromechanical drive 8 is located beneath the housing 2 and is therefore not visible. The electromechanical drives 8 are disposed on the outside of the housing 2 of the air vent 1. The electromechanical drive 8 is shown in an enlarged view in FIG. 3.

Figure 3:
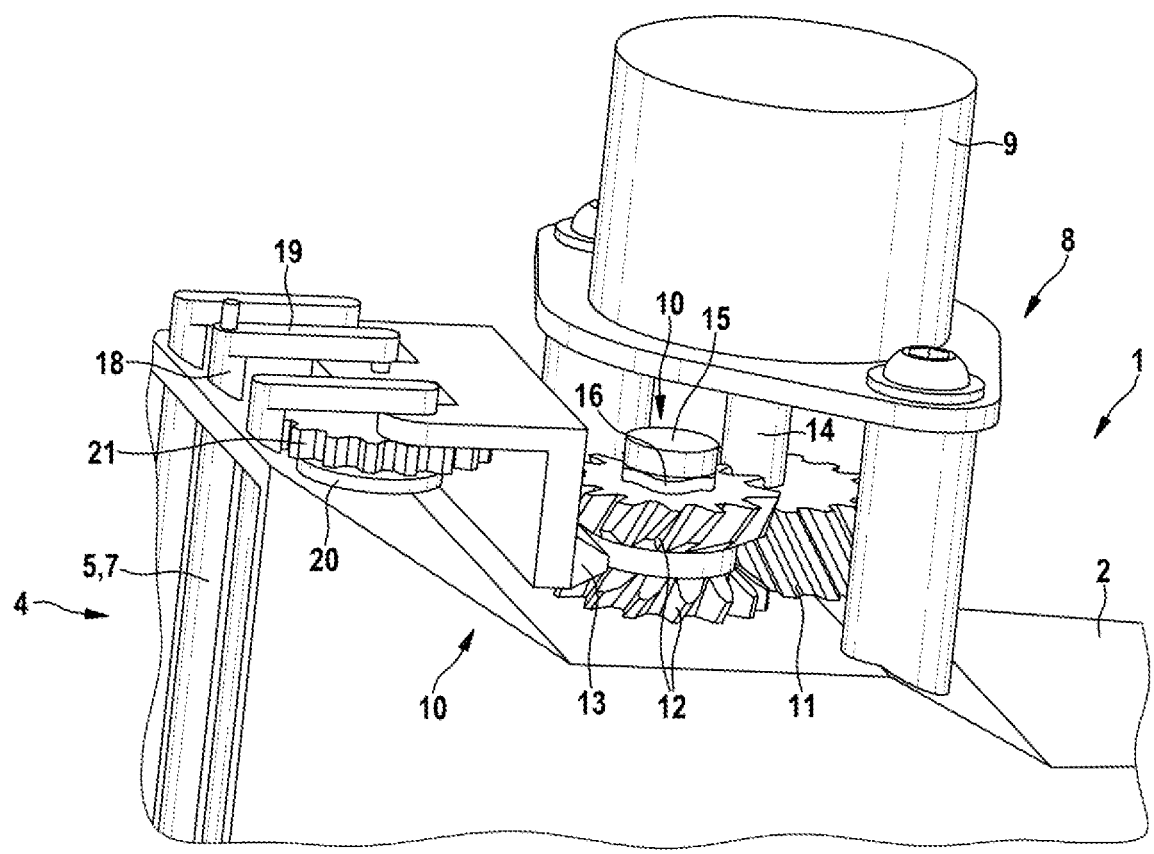
FIG. 3 shows an electromechanical drive of the air vent in FIGS. 1 and 2 in a perspective illustration.

In FIGS. 1 to 3, the gear system 10 is a rack and pinion gear system, comprising helical pinions 11, 12 and a helically toothed rack 13. A first pinion 11 is fixedly disposed on a motor shaft 14 of the electric motor 9, and two second helical pinions 12 are rotatably and axially displaceably disposed on a stationary shaft 15, which projects laterally to the outside from the housing 2. The two second helical pinions 12 are non-rotatable with respect to one another and are axially spaced apart from one another, at a distance that is as wide as, or slightly wider than, the toothed rack 13 is wide. In the exemplary embodiment, the two second pinions 12 are formed by two coaxial and axially spaced-apart helical splines of a double pinion. The axial displaceability of the two second pinions 12 and the axial distance with respect to one another are so limited that no more than one of the two second pinions 12 at a time meshes with the first pinion 11. The pinions 11, 12 and the toothed rack 13 can, generally speaking, also be interpreted as gear elements of the rack and pinion gear system.

The toothed rack 13 is guided displaceably at the housing 2, tangential to the two second pinions 12. In an initial position of the second pinions 12 illustrated in the drawing, which can also be interpreted as a neutral position, the toothed rack 13 is disengaged from the two second pinions 12, so that a drive connection of the gear system 10 from the electric motor 9 to the blades 7 of the first grille 5 is interrupted, which can also be interpreted as releasing or disengaging of the gear system 10.

Due to the helical splines, rotational driving of the pinions 11, 12 causes an axial force, which is directed toward or away from the housing 2, depending on a direction of rotation, and which in one direction of rotation causes one of the two second pinions 12 to engage with the toothed rack, and in the opposite direction of rotation causes another of the two second pinions 12 to engage with the toothed rack 13. As a result of the rotational driving, regardless in which direction of rotation, the drive connection from the electric motor 9 to the blades 7 of the first grille 5 is thus established, and the gear system 10 is closed, which can also be interpreted as an engaging of the gear system 10. "Releasing" and "closing" of the gear system 10 thus denote the interruption and the establishment of the drive connection to the blades 7. Rotational driving in one direction of rotation causes the toothed rack 13 to be displaced in one direction by the one of the two second pinions 12, and rotational driving in the opposite direction of rotation causes the toothed rack 13 to be displaced in an opposite direction by the other of the two second pinions 12.

Two corrugated axial spring washers on the stationary shaft 15 on both sides of the second pinions 12 urge the two second pinions 12 into the initial or neutral position, without these meshing with the toothed rack 13, so that the drive connection is interrupted. The two axial spring washers together are referred to as a return spring 16 here.

As described, the gear system 10 closes automatically when rotationally driven, and also releases automatically when at a standstill, so that the blades 7 can be manually pivoted when the gear system 10 is at a standstill. A tab 17 for manually pivoting the blades 7 of this first grille 5 is disposed on one blade 7 of one of the two grilles 5, 6. By way of a passage not visible in the drawing, the blades 7 of the second grille 6 can also be pivoted by way of the tab 17, the grille, as mentioned above, likewise comprising an identically constructed, or in any case functionally equivalent, electromechanical drive 8, which is hidden by the housing 2 and therefore not visible. By way of a damping device, which is not shown, for example at the tab 17 or at the bearing points of the blades 7, the manual adjustment movement is damped in a known manner, and thus the desired operating forces are maintained.

On the outside the housing 2, on the side, the blades 7 comprise levers 19, which are rigidly connected thereto, disposed parallel to one another and projecting radially from the blade shafts 18, and which are connected in an articulated manner to the toothed rack 13, so that the blades 7 of the grille 5, 6 pivot in parallel together as a result of the displacement of the toothed rack 13.

The toothed rack 13 also transmits pivoting motion between the blades 7 during manual pivoting.

The air vent 1 comprises a potentiometer 20, for measuring a pivot angle of the blades 7, including a potentiometer gear wheel 21 that is rigidly disposed on a potentiometer shaft and meshes with second splines of the toothed rack 13.

The potentiometer can, generally speaking, also be interpreted as a pivot angle sensor for the blades 7.

In the following description of the additional figures, the same reference numerals as in FIGS. 1 to 3 are used for components that are consistent with those in FIGS. 1 to 3 and, in addition, reference is made to the description with respect to FIGS. 1 to 3 to describe the additional figures.

Figure 4:
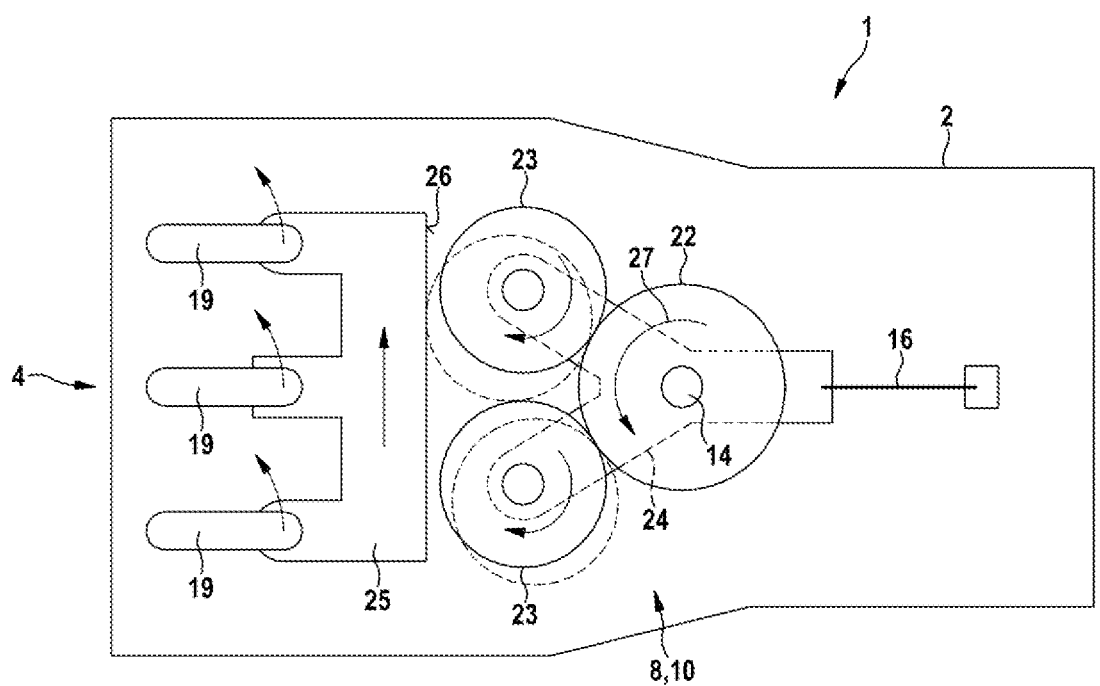
FIG. 4 shows a view of a second exemplary embodiment of an air vent according to the invention.
Figure 5:
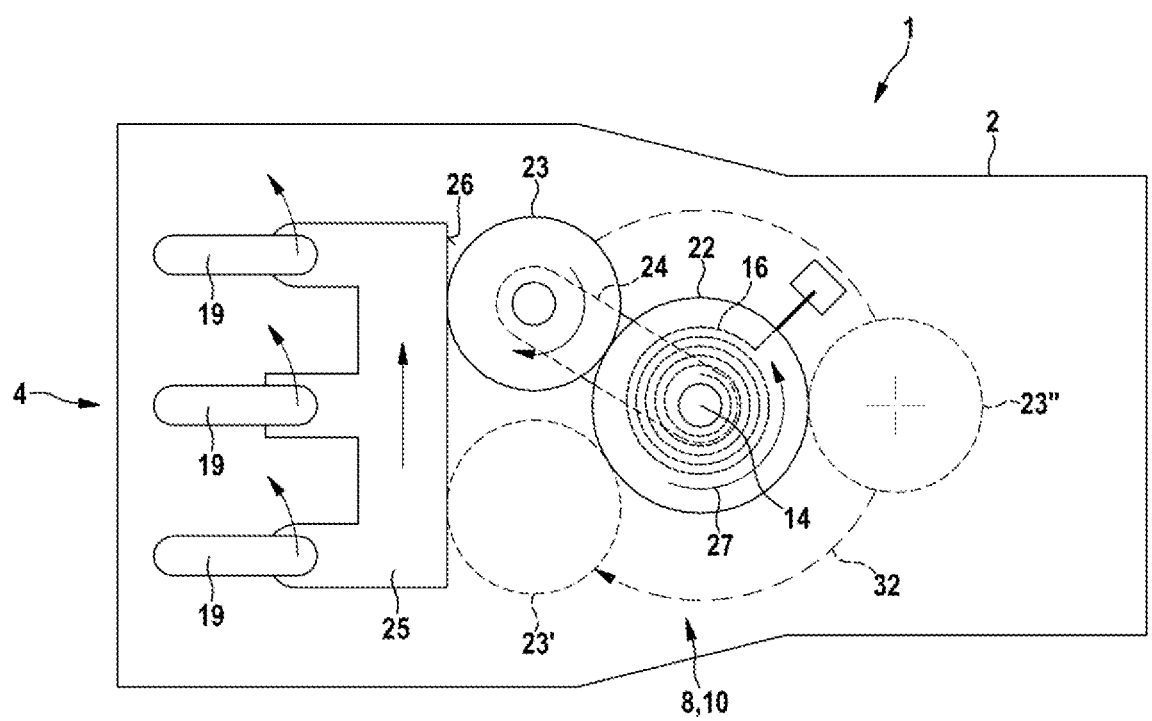
FIG. 5 shows a view of a third exemplary embodiment of an air vent according to the invention, which is modified compared to FIG. 4.

The air vents 1 in FIGS. 4 and 5 comprise friction wheel mechanisms instead of gear wheel mechanisms. The gear system 10 of the air vent 1 in FIG. 4 comprises a first friction wheel 22 and two second friction wheels 23, which roll on a circumference of the first friction wheel 22. This means that the second friction wheels 23, at circumferential points, are pushed against the circumference of the first friction wheel 22, so that torque and rotation are transmitted between the friction wheels 22, 23. The two second friction wheels 23 are offset from one another in the circumferential direction of the first friction wheel 22 and are rotatably mounted on a Y-shaped friction wheel holder 24, which is rotatably mounted about an axis of the first friction wheel 22. In this way, the two second friction wheels 23 are displaceable in the circumferential direction of the first friction wheel 22.

Instead of the toothed rack 13, the air vent 1 according to the invention in FIG. 4 comprises a further friction member 25, which is displaceably guided tangentially to the first friction wheel 22 and comprises a straight rolling surface 26, which is tangential to the first friction wheel 22, the distance of which from the circumference of the first friction wheel 22 being slightly less than a diameter of the second friction wheels 23.

As a result of the first friction wheel 22 being rotationally driven by way of the electric motor 9 (not shown in FIGS. 4 and 5) of the electromechanical drive 8, the two second friction wheels 23 are not only rotationally driven but also moved in the direction of rotation along the circumference of the first friction wheel 22 until a circumference of one of the two second friction wheels 23 bears against the rolling surface 26 of the further friction member 25. The rotating second friction wheel 23 displaces the further friction member 25 by way of friction. In the case of an assumed counter-clockwise direction of rotation of the first friction wheel 22, as is illustrated in FIG. 4 by the rotation arrow 27, the two second friction wheels 23 rotate clockwise and are displaced in the circumferential direction of the first friction wheel 22 in the direction of rotation, which is to say counter-clockwise in the described case, and downward in FIG. 4. The second friction wheel 23, rolling on the rolling surface 26 of the further friction member 25, displaces the further friction member 25 upward in FIG. 4. The directions of rotation of the friction wheels 22, 23 and of the further friction member 25 are illustrated by arrows in FIG. 4, and the displacement of the two second friction wheels 23 is illustrated by dotted lines.

When the first friction wheel 22 is rotationally driven in the opposite direction, the directions of rotation of the friction wheels 22, 23 are reversed, the two second friction wheels 23 are displaced upward in FIG. 4, and the further friction member 25 is displaced in the opposite direction, which is to say downward in FIG. 4.

During standstill of the friction wheels 22, 23 without being rotationally driven, a return spring 16 pivots the friction wheel holder 24 into an initial position or neutral position, in which both second friction wheels 23 are lifted off the rolling surface 26 of the further friction member 25, so that the drive connection is interrupted, and the gear system 10 is released or disengaged. In the exemplary embodiment, the return spring 16 is a leaf spring, having one end thereof fixed at the housing 2 of the air vent 1 and having the other end thereof fixed at the friction wheel holder 24.

Levers 19 of pivotable blades, which are not visible in FIG. 4, of a grille are hinged at the further friction member 25 for guiding an air current through the housing 2 of the air vent 1, so that the displacement of the further friction member 25 pivots the blades in parallel together. In this regard, reference is made to the corresponding descriptions of FIGS. 1 to 3.

Compared to a gear system comprising splines, as in the first exemplary embodiment, a friction wheel mechanism has the advantage that no damage can occur in the event of manual operation in parallel with the electromechanical adjustment of the blades, since the friction surfaces are able to slide on one another in the case of opposing forces.

In FIG. 5, the gear system 10 comprises a first friction wheel 22 and, in contrast to FIG. 4, only one second friction wheel 23, which rolls on the first friction wheel 22. The second friction wheel 23 is rotatably mounted on a friction wheel holder 24, which can be rotated about the axis of the first friction wheel 22, so that the second friction wheel 23 can be moved on a circular path around the first friction wheel 22.

As in FIG. 4, the air vent 1 according to the invention in FIG. 5 comprises a further friction member 25, which is displaceably guided at the housing 2 of the air vent 1, tangentially to the first friction wheel 22, and which comprises a straight rolling surface 26, tangential to the first friction wheel 22, at a distance from the circumference of the first friction wheel 22 that is slightly less than a diameter of the second friction wheel 23.

As a result of the first friction wheel 22 being rotationally driven counter-clockwise, the second friction wheel 23 rolling on the first friction wheel 22 is rotationally driven clockwise, and moved in the direction of rotation of the first friction wheel 22, in the assumed case this being counter-clockwise, around the first friction wheel 22, until the second friction wheel 23, with the circumference thereof, rests against the rolling surface 26 of the further friction member 25. The second friction wheel 23, rotating clockwise, displaces the further friction member 25 upward in the case assumed in FIG. 5. The described directions of rotation of the two friction wheels 22, 23 and the displacement of the further friction member 25 are illustrated by arrows in FIG. 5.

Rotational driving in the opposite direction reverses the movements, so that the second friction wheel 23, as illustrated by the dotted arrow 32, moves around the first friction wheel 22 into the position in which it rests against the first friction wheel 22 and against the further friction member 25, which is shown by dotted lines and denoted by reference number 23'. As in FIG. 4, levers 19 in FIG. 5 are also pivotable, and blades (not visible in FIG. 5) of a grille are connected in an articulated manner at the further friction member 25, so that the displacement of the further friction member 25 pivots the blades by way of the levers 19.

The air vent 1 in FIG. 5 comprises a spiral spring, serving as the return spring 16, having the outer end thereof fixed at the housing 2 of the air vent, and having the inner end thereof fixed at the friction wheel holder 24. The return spring 16 acts on the friction wheel holder 24, so that the second friction wheel 23 during standstill, without being rotationally driven, reaches an initial position, or neutral position, away from the further friction member 25, which in FIG. 5 is likewise illustrated by dotted lines and denoted by reference numeral 23'. When the first friction wheel 22 is rotationally driven, the second friction wheel 23 moves in the direction of rotation of the first friction wheel 22 by slightly less than 180° around the first friction wheel 22, until the second friction wheel 23 bears against the rolling surface 26 of the further friction member 25 and, with continued rotational driving, displaces the further friction member 25.

Figure 6:
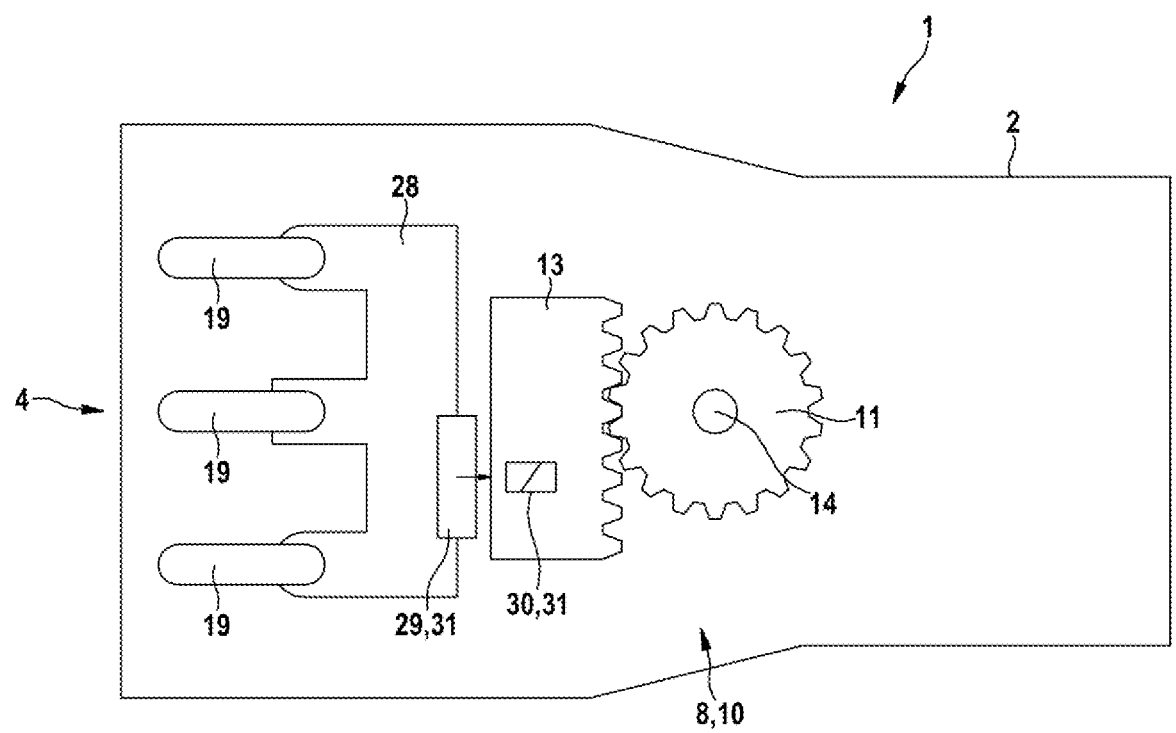
FIG. 6 shows a view of a fourth exemplary embodiment of an air vent according to the invention.

The air vent 1 according to the invention shown in FIG. 6 comprises a rack and pinion gear system, comprising a pinion 11 meshing with a toothed rack 13. Rotational driving of the pinion 11 by way of an electric motor 9, which is not shown in FIG. 6, displaces the toothed rack 13. The air vent 1 in FIG. 6 comprises a pivot element 28, which is guided displaceably at the housing 2 parallel to the toothed rack 13. The pivot element 28 comprises a ferromagnetic armature 29, which is held by the pivot element 28 fixedly in the displacement direction and displaceably in the direction of the toothed rack 13. The toothed rack 13 comprises an electromagnet 30 which, together with the armature 29, forms an electromagnetic clutch 31 connecting the pivot element 28 to the toothed rack 13 when the electromagnet 30 is energized, which is to say the electromagnetic clutch 31 is closed or engaged. The armature 29 and the electromagnet 30 can, generally speaking, also be interpreted as clutch parts of the electromagnetic clutch 31.

By way of the pivot element 28, the levers 19 of the pivotable blades of a grille, which are also not visible in FIG. 6, are hinged to the toothed rack 13 as in FIGS. 1 to 3, and to the further friction member 25 in FIGS. 4 and 5, so that the displacement of the toothed rack 13 pivots the blades when the electromagnetic clutch 31 is closed or engaged.

When the electromagnetic clutch 31 is released or disengaged, which is to say when the electromagnet 29 is not energized, the pivot element 28 can be displaced with respect to the toothed rack 13, so that the blades, which are not visible in FIG. 6, can be manually pivoted.

All exemplary embodiments of the air vent 1 comprise a potentiometer 20, or another pivot angle sensor, which can establish the pivot position of the blades 7, which can have been manually pivoted when the electromechanical drive 8 is at a standstill, in the case of the gear system 10 having been released or disengaged.

List of Reference Numerals 1 air vent
2 housing
3 flow arrow
4 air outlet opening
5 first grille
6 second grille
7 blade
8 electromechanical drive
9 electric motor
10 gear system
11 first pinion
12 second pinion
13 toothed rack
14 motor shaft
15 stationary shaft
16 return spring
17 tab
18 blade shaft
19 lever
20 potentiometer
21 potentiometer gear wheel
22 first friction wheel
23 second friction wheel
24 friction wheel holder
25 further friction member
26 rolling surface
27 rotation arrow
28 pivot element
29 armature
30 electromagnet
31 electromagnetic clutch
32 dotted arrow

The invention claimed is:

1. An air vent, comprising a pivotable blade for guiding and/or controlling an air current flowing through the air vent, and comprising an electromechanical drive, including a gear system, for pivoting the blade,
wherein the gear system is releasable so that a drive connection of the gear system is interrupted, and
wherein the gear system comprises a helically toothed rack, a first helical pinion, and two second helical pinions, of which at least one meshes with the first helical pinion, and which are axially movable with respect to the first helical pinion, so that an axial force, which arises during transmission of torque between the first pinion and at least one of the two second pinions, causes at least one second pinion to engage with, or the second pinions to disengage from, the toothed rack.

2. The air vent according to claim 1, wherein the two second helical pinions are coaxial to one another and/or non-rotatable with respect to one another and/or are axially spaced apart from one another.

3. The air vent according to claim 1, wherein the electromechanical drive comprises a return spring, which urges the two second helical pinions into a neutral position in which the two second helical pinions are disengaged from the toothed rack to interrupt the drive connection.

4. The air vent according to claim 1, wherein the electromechanical drive includes an electric motor, the first helical pinion being fixedly disposed on a motor shaft of the electric motor, and the two second helical pinions are rotatably and axially displaceably disposed on a stationary shaft.

5. The air vent according to claim 4, wherein the two second helical pinions are non-rotatable with respect to one another and are axially spaced apart from one another.

6. The air vent according to claim 4, wherein the two second helical pinions are axially spaced apart from one another at a distance that is at least as wide as the toothed rack is wide.

7. The air vent according to claim 4, wherein the toothed rack is guided displaceably tangential to the two second helical pinions.

8. The air vent according to claim 4, wherein the two second helical pinions are axially spaced apart from one another, and the axial displaceability of the two second helical pinions and the axial distance with respect to one another are so limited that no more than one of the two second helical pinions at a time meshes with the first helical pinion.

9. The air vent according to claim 1, wherein rotational driving of the first helical pinion causes an axial force, in which one direction of rotation causes one of the two second helical pinions to engage with the toothed rack, and an opposite direction of rotation causes another of the two second helical pinions to engage with the toothed rack.

10. The air vent according to claim 9, wherein the rotational driving in the one direction of rotation causes the toothed rack to be displaced in one direction by the one of the two second helical pinions, and the rotational driving in the opposite direction of rotation causes the toothed rack to be displaced in an opposite direction by the other of the two second helical pinions.

11. The air vent according to claim 10, wherein the gear system connects automatically when rotationally driven so that transmission of torque between the first helical pinion and at least one of the two second helical pinions causes at least one of the two second helical pinions to engage with the toothed rack, and wherein the gear system is interrupted automatically when at a standstill so that the two second helical pinions are disengaged from the toothed rack, thereby enabling the blade to be manually pivoted when the gear system is at the standstill.

12. The air vent according to claim 11, wherein the electromechanical drive comprises a return spring, which urges the two second helical pinions into a neutral position in which the two second helical pinions are disengaged from the toothed rack when the gear system is at the standstill.

13. The air vent according to claim 12, wherein the return spring comprises corrugated axial spring washers on both sides of the second helical pinions.

\* \* \* \* \*